Feb. 27, 1968 R. L. CARLSON ETAL 3,370,422
STEERING CONTROL SYSTEM
Filed March 10, 1966
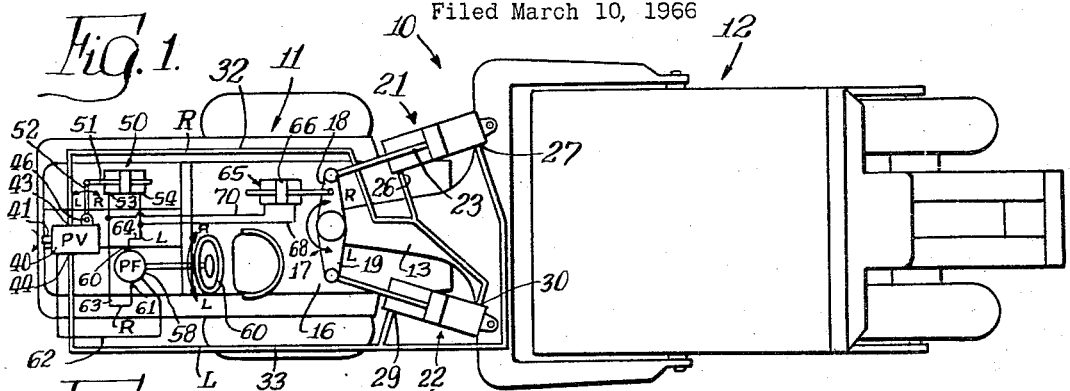
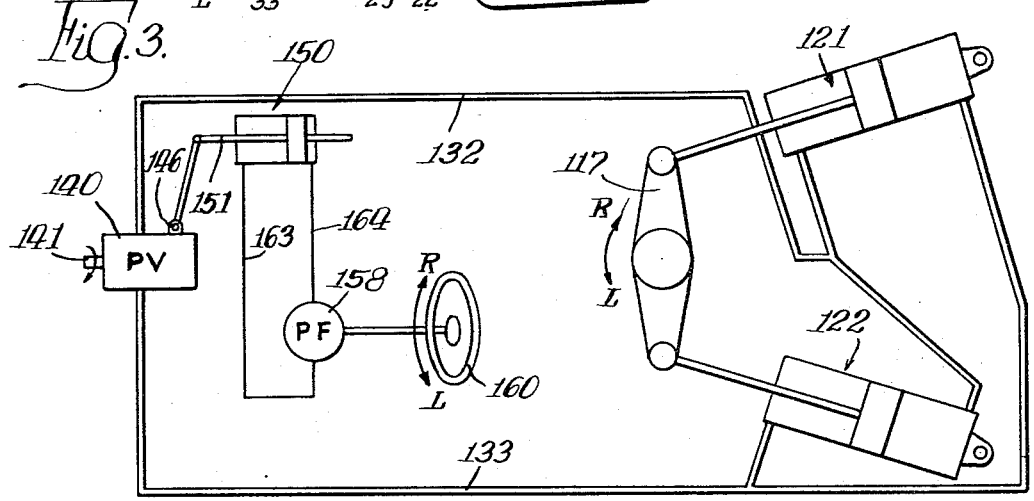
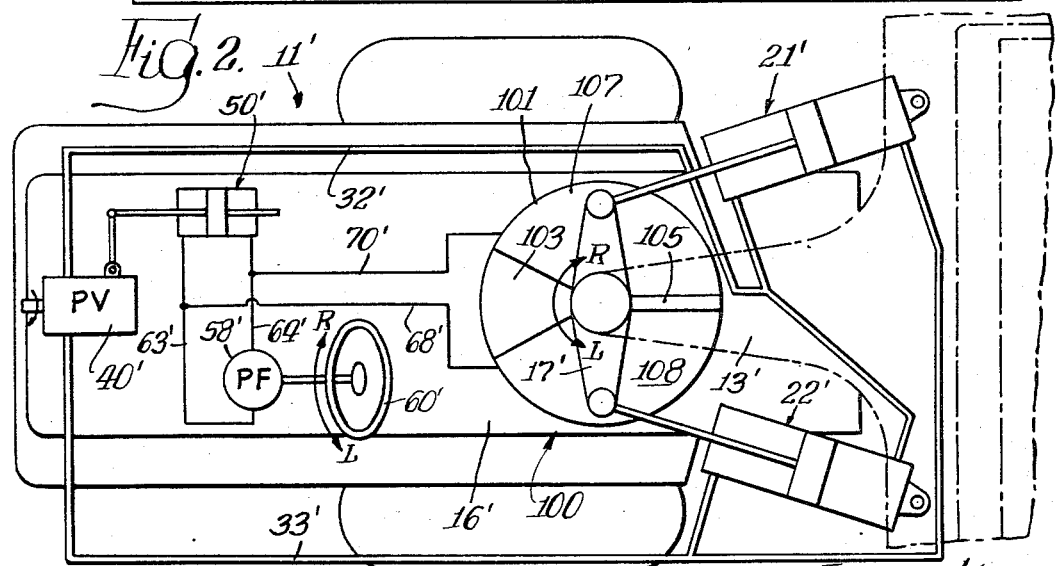
Inventors:—
Robert L. Carlson,
Julius F. Marquardt,
By Robert B. Zirr
Atty

United States Patent Office 3,370,422
Patented Feb. 27, 1968

3,370,422
STEERING CONTROL SYSTEM
Robert L. Carlson, Chicago, and Julius F. Marquardt, Westchester, Ill., assignors to International Harvester Company, Chicago, Ill., a corporation of Delaware
Filed Mar. 10, 1966, Ser. No. 533,137
2 Claims. (Cl. 60—52)

ABSTRACT OF THE DISCLOSURE

A vehicle steering system having a steering control adapted to develop hydraulic fluid flow to the steering actuators at a rate proportional to the rate of movement of the steering control means. Hydraulic feed-back means are provided to neutralize the flow of steering fluid upon a steering movement of the vehicle.

SUMMARY OF THE INVENTION

This invention relates generally to power steering systems and, more particularly, to an improved hydraulic steering system for a vehicle in which the rate of steering movement may be variable as desired.

Power steering systems have been provided in the past for heavy duty off-the-road type of vehicles, such as combination tractor and earth scraper vehicles. Power steering systems for such heavy duty equipment have generally included a shiftable steering control valve for porting fluid from a source of fluid under pressure to hydraulic actuators connected to the mechanical steering elements of the vehicle. The steering control valve in these prior units are either positionable through mechanical linkage by a manual steering member, or by a hydraulic pump driven by the manual steering member.

A serious disadvantage in these prior units has resulted from the fact that the steering rate of the vehicle is not proportional to the steering movement of the operator controlled steering member. Attempts have been made in the past to overcome this deficiency by providing multiple ports in the control valve or, by providing an additional selectively operable pump for porting fluid through the control valve to the hydraulic steering actuators. Now while these prior attempts have recognized the problem and the desirability of providing plural steering rates, they have not satisfactorily provided the desired infinitely variable steering rate.

The present invention comprehends a steering system in which is provided hydraulic actuators for turning the vehicle at a rate determined by the speed at which the operator turns the manually controlled steering member, such as the steering wheel. Toward this end, an infinitely variable displacement pump is provided for delivering fluid at any desired rate to the hydraulic steering actuators, thus permitting the actuators to be driven and the vehicle to be turned at any desired rate. A control system positions the displacement of the variable displacement pump to achieve any desired steering rate.

It is, therefore, a principal feature of the present invention to provide a new and improved fluid power steering system for a vehicle in which the steering rate is infinitely variable between predetermined limits as desired.

A further feature of the invention is the provision of a new and improved power steering system for a vehicle as described above in which a variable steering rate is effected by providing an infinitely variable displacement hydraulic pump for delivering fluid to the hydraulic steering actuators.

Another feature of the present invention is the provision of the type described above in which an improved control is provided for varying the displacement of the hydraulic pump including a servo-motor connected to the displacement varying member of the pump, a second steering pump driven by a manually positionable steering member and connected to port fluid to position the servo-motor as desired.

A yet further feature of the invention is the provision of a new and improved steering system of the type described above in which a feedback system is provided for achieving a follow-up action in the steering system including a feedback pump responsive to actual vehicular position for porting fluid to the servo-motor in opposition to the steering pump to reposition the servo-motor toward its neutral position thereby placing the variable displacement power pump at zero displacement and terminating the steering movement.

Still another feature of the present invention is the provision of a new and improved power steering system of the type described above in which the feedback pump takes the form of a reciprocating hydraulic piston unit.

A further feature of the invention is the provision of a new and improved power steering system for a vehicle as described above in which the feedback pump comprises a rotary vane type pump.

Other features and advantages of the invention will be apparent from the following description taken in connection with the accompanying drawing wherein:

DESCRIPTION OF THE DRAWINGS

FIG. 1 is a top plan view of a vehicle with a power steering system embodying the invention shown in generally schematic form thereon;

FIG. 2 is a top plan view of a portion of a vehicle incorporating a hydraulic circuit shown in schematic form according to a modified embodiment of the invention; and FIG. 3 is a schematic hydraulic circuit according to still another embodiment of the invention.

DESCRIPTION OF THE PREFERRED EMBODIMENT

In the exemplary embodiment of the invention as disclosed in FIG. 1 of the drawings, an earth moving vehicle 10 is seen to include a tractor 11 and an earth scraper 12, pulled by the tractor. Scraper 12 has a gooseneck 13 extending from the front end thereof and pivotally connected to a frame 16 forming a portion of the tractor 11. The tractor frame 16 carries a steering arm member 17, having oppositely extending arm portions 18 and 19. The arm 17, thus, moves and turns with the tractor 11.

Connected between the scraper gooseneck 13 and the steering arm 17 are hydraulic actuators 21 and 22, each having piston rods 23 slidable therein and pivotally connected to the ends of arms 18 and 19. Actuator 21 includes ports 26 and 27 for delivering hydraulic fluid to and from the actuator, while actuator 22 is provided with similar ports 29 and 30. Hydraulic supply and return conduit 32 conveys fluid to and from ports 26 and 30, while supply conduit 33 conveys fluid to and from ports 27 and 29.

Thus, when hydraulic fluid is ported through conduit 32 it passes through port 26 adjacent the rod end of cylinder 21 retracting the cylinder, and through port 30 and cylinder 22 extending the cylinder, causing a right turning movement of the vehicle. As the vehicle thusly turns, fluid is ported from ports 27 and 29 through conduit 33 which is then a return passage. Conversely, when high pressure fluid is ported through conduit 33, leftward turning movement of the vehicle 10 is effected.

A variable displacement hydraulic pump 40 is provided for delivering fluid at any desired rate to the actuators 21 and 22 up to the maximum capacity of the pump 40. Pump 40 may take the form of a rotary cylinder barrel, multiple axial piston swashplate pump. In pumps of this type, a rotary cylinder barrel is provided with a plurality of cam reciprocated pistons slidable therein in an annular array. A drive shaft 41 is connected to be driven through suitable mechanical gearing by the vehicle engine. Drive shaft 41 rotates the cylinder block causing reciprocation of the pistons and delivery of fluid through one of the main pump ports 43 or 44. A cam comprising a variable angle swashplate 46 is movable from a neutral position to maximum displacement positions on either side of neutral. In pumps of this type, when the swashplate 46 is in neutral position, the pistons are not reciprocated even though shaft 41 is driven continuously, and no flow is had through either port 43 or 44. When the swashplate is moved to the right, i.e., in the direction of the arrow designated "R," port 43 becomes the high pressure discharge port and conducts fluid to conduit 32. At this time, port 44 becomes the low pressure inlet and receives fluid returning through conduit 33, thereby effecting a rightward steering movement of the vehicle. Reversely, when swashplate 46 is moved to the left from its neutral position, i.e., in the direction of the arrow designated "L," port 44 becomes the high pressure discharge port conducting fluid to conduit 33, while port 43 becomes the low pressure inlet receiving fluid returning through conduit 32 to effect a leftward steering movement of the vehicle.

The swashplate member 46 is positioned by a servo-cylinder 50 having a piston rod 51 connected through a link 52 to the swashplate member 46. Servo-cylinder or motor 50 is of the reciprocating piston type having ports 53 and 54 adapted to selectively convey fluid to and from the servo-motor 50 to effect reciprocation thereof.

A control assembly is provided herein for positioning the servo-motor 50 and, thus, controlling the steering movement of the vehicle. Toward this end, a steering pump 58 is provided connected to be driven by suitable steering wheel 60 which is manually turned by the operator. Steering pump 58 may take the form of a rotary fixed displacement pump so that it delivers fluid at a rate determined by the rate of steering movement of the wheel 60 by the operator. Pump 58 is arranged so that upon leftward turning movement of the steering wheel fluid is ported from port 60, and upon rightward turning movement of the vehicle fluid is ported from port 61. A suitable conduit 63 connects port 61 to port 53 in the servo-motor 50, while conduit 64 connects port 60 with port 54 in the servo-motor 50. With this construction, it may be seen that when the operator rotates the steering wheel to the left as shown in FIG. 1, that pump 58 will port fluid through line 64 to the right side of servo-motor 50 at a flow rate proportional to the rate of steering movement of steering wheel 60. Similarly, when the operator rotates the steering wheel 60 to the right, pump 58 will deliver fluid through port 61 and conduit 63 to the left side of servo-motor 50 moving piston rod 51 to the right. Alternatively, conduit 62 could merely be connected to a reservoir for supplying make-up fluid as needed without charging.

A feedback or follow-up control is provided in the FIG. 1 embodiment for providing a follow-up action in the steering system. Toward this end, a feedback pump 65 is provided which takes the form of a reciprocating piston and cylinder hydraulic unit. Unit 65 includes a piston 66 having a rod connected to arm 17 so that the piston 66 is positioned in its cylinder in accordance with the position of arm 18 with respect to gooseneck 13. The cylinder in unit 65 is carried by the gooseneck 13. It should be understood that feedback pump 65 and the other hydraulic component shown in FIG. 1 are merely shown in schematic form and are not illustrated to show their actual position on the vehicle or a detailed construction thereof. Upon rightward steering movement of the vehicle, piston 66 delivers fluid through conduit 68 to the right side of servo-motor 50, and upon leftward steering movement of the vehicle, piston 66 ports fluid through conduit 70 to the left side of the hydraulic actuator 50 in feedback fashion. The pump 65 is arranged to reposition the servo-motor 50 and the swashplate 46 in its neutral position when the desired extent of steering has been effected.

In some instances, the steering wheel may be directly mechanically connected to the swashplate member 46 to vary the displacement of the pump 40, although the specifically disclosed servo-control is preferable.

In operation of the FIG. 1 embodiment of the present steering system, assume that the operator turns the steering wheel 68 a predetermined angular distance to the right. This movement drives pump 58 to deliver fluid through conduit 63 to the left side of servo-motor 50, thereby moving piston rod 51 to the right. This movement causes rotation of swashplate member 60 from its neutral position causing flow from variable displacement pump 40 through conduit 32 to actuator ports 26 and 30. Actuator 21 retracts while actuator 22 extends under this fluid power causing clockwise rotation of the steering arm 17 and tractor 11 with respect to scraper 12, thereby effecting a rightward steering movement of the vehicle. As the vehicle turns to the right, feedback pump 65 delivers fluid through conduit 68 into the left side of servo-motor 50. As the vehicle approaches the desired turn angle, the fluid flowing from feedback pump 65 through conduit 68 will return the servo-motor 50 to its neutral position thereby precluding stroking of pump 40. Thus, when the operator ceases turning movement of wheel 60, pump 40 will discontinue delivery of fluid even though the pump is continuously driven by shaft 41.

Upon leftward steering movement of the vehicle, a reversely identical operation occurs. Thus, fluid is ported from steering pump 68 through conduit 64 to the right hand side of servo-motor 50, causing the counter-clockwise rotation of swashplate member 46. This reverses the displacement of pump 40 from that described above so that port 44 becomes the high pressure discharge port while fluid is delivered through conduit 33 to actuators 21 and 22 effecting leftward steering movement of the vehicle. Feedback piston 65 then ports fluid through conduit 70 returning the servo-motor to its neutral position when the desired steering angle has been reached.

An increased rate of steering wheel 60 movement by the operator causes hydraulic fluid to be ported from steering pump 68 at an increased rate. This has the effect of moving the servo-motor or rod 51 further than would occur with a slow steering wheel movement. This increases the angle of swashplate member 46 causing an increased rate of flow from the variable displacement pump 40, and an increased rate of movement of actuators 21 and 22. Thus, the rate of vehicular steering is infinitely variable up to the maximum flow rate of pump 40 and is a function of the speed of turning of the steering wheel.

Referring now to FIG. 2, another embodiment of the invention is shown, which differs from the FIG. 1 embodiment in that instead of a reciprocating piston feedback pump 65, a rotary vane type pump 100 is provided for achieving follow-up action in the system. The components in FIG. 2 which are identical to those in FIG. 1 have similar reference numerals in FIG. 2 except that they are suffixed with a prime.

The rotary vane feedback pump 100 provides the same function as feedback pump 65, but provides a greater linearity in the feedback characteristics thereof over a greater angular degree of turn. The pump 100 includes a casing 101 fixed with respect to the tractor frame 16' having a stationary partition 103 therein. Rotatable within the casing 101 is a radial vane 105 which defines the casing chambers 107 and 108. Vane 105 is fixed to a steering king pin which pivots with the scraper gooseneck 13'. Thus, during the rightward steering movement of the vehicle, vane 105 delivers fluid from chamber 107 through conduit 70' to the right side of actuator 50' returning it toward its neutral position. On the other hand, during leftward steering movement of the vehicle, vane 105 ports fluid from chamber 108 through conduit 68' to the left side of hydraulic actuator 50' returning it to its neutral position where pump 40' ceases delivery.

Referring to FIG. 3, certain advantages of the present invention are apparent in a hydraulic system without a follow-up action. Such a system, as shown in FIG. 3 is basically an on-off system, while retaining the desirable feature of providing a variable steering rate of the vehicle. Actuators 121 and 122 are provided for effecting vehicular steering by providing a relative rotation of a steering arm 117 in a similar manner to that described above with reference to FIG. 1. The other components are identical to that described above with reference to FIG. 1, except that no feedback pump 65 is provided.

In operation of the FIG. 3 embodiment, when the operator turns the steering wheel to the right, steering pump 158 delivers fluid to servo-motor 150 at a rate determined by the rate of movement of steering wheel 160. This results in the movement of the piston rod 151 to the right increasing the displacement of hydraulic unit 140 in one direction to deliver fluid through conduit 132 to actuators 121 and 122 thereby effecting the rightward steering movement of the vehicle. Of course, without follow-up action the steering movement will continue until the operator returns the steering wheel so that servo-motor 150 moves back to its neutral position. The operation is identical upon the leftward steering movement as well, except that fluid is ported through conduit 133 and returned through conduit 132. The faster the operator moves the steering wheel 160, the faster the movement of swashplate member 146, with the result of a greater vehicular steering rate.

Thus, in accordance with the objects of the present invention, a power steering system for an off-the-road vehicle is herein disclosed having an infinite rate of steering speed up to a predetermined maximum rate. The present invention provides a variable steering rate with a smooth transition from one steering rate to another. Further, in accordance with the teachings of the invention, no steering control valve heretofore necessary in steering systems of this type is required, providing a simplified system heretofore unknown in this art.

While we have shown and described certain embodiments of our invention, it is to be understood that it is capable of many modifications. Changes, therefore, in the construction and arrangement may be made without departing from the spirit and scope of the invention as defined in the appended claims.

We claim:

1. A power steering system for a vehicle in which the steering rate of the vehicle is variable as desired, the combination comprising: a first member; a second member movable relative to said first member to effect vehicular steering; fluid actuator means between said first and second members to provide the relative steering movement of the members; means for supplying fluid to said actuator at a flow rate proportional to the desired steering rate including a variable displacement fluid unit, said fluid unit including a rotary variable displacement hydraulic pump having inlet and outlet ports; means for continuously rotating the pump of said fluid unit; means for varying the displacement of the fluid unit to vary the rate of fluid flow therefrom, said displacement varying means being movable to a neutral position to provide no flow from the pump and to a maximum displacement position on each side of neutral to provide reversible flow through said ports, said displacement varying means further including a hydraulic servo-motor; conduit means connected to said hydraulic pump ports to deliver fluid to and from the hydraulic actuator means; control means for varying the rate of movement of the displacement varying means to thereby vary the steering rate of the vehicle as desired; and, feed-back means including a reciprocating piston hydraulic unit connected to be driven by one of said first and second members, conduit means connecting said piston hydraulic unit to deliver fluid to and from said servo-motor for moving said displacement varying means to the neutral position responsive to vehicle steering.

2. A power steering system for a vehicle in which the steering rate of the vehicle is variable as desired, the combination comprising: a first member, a second member movable relative to said first member to effect vehicular steering; fluid actuator means between said first and second members to provide the relative steering movement of the members; means for supplying fluid to said actuator at a flow rate proportional to the desired steering rate including a variable displacement fluid unit, said fluid unit including a rotary variable displacement hydraulic pump having inlet and outlet ports; means for continuously rotating the pump of said fluid unit; means for varying the displacement of the fluid unit to vary the rate of fluid flow therefrom, said displacement varying means being movable to a neutral position to provide no flow from the pump and to a maximum displacement position on each side of neutral to provide reversible flow through said ports, said displacement varying means further including a hydraulic servo-motor; conduit means connected to said hydraulic pump ports to deliver fluid to and from the hydraulic actuator means; control means for varying the rate of movement of the displacement varying means thereby to vary the steering rate of the vehicle as desired; and, feed-back means including a rotary vane pump connected to be driven by one of said first and second members, and conduit means connecting said vane pump to deliver fluid to and from the servo-motor for moving said displacement varying means to the neutral position responsive to vehicle steering.

References Cited

UNITED STATES PATENTS

| | | | |
|---|---|---|---|
| 1,603,867 | 10/1926 | Rogers | 60—52 |
| 1,638,786 | 8/1927 | Smith | 60—52 |
| 1,747,349 | 2/1930 | Crain | 60—52 |
| 2,213,968 | 9/1940 | Rose | 60—52 |

FOREIGN PATENTS

| | | |
|---|---|---|
| 892,574 | 1/1944 | France. |

EDGAR W. GEOGHEGAN, *Primary Examiner.*